United States Patent [19]

Killpack

[11] Patent Number: 4,790,059

[45] Date of Patent: Dec. 13, 1988

[54] CARPET LAYING TOOL AND METHOD OF USE

[76] Inventor: Ronald E. Killpack, 216 N 1160 E, Springville, Utah 84663

[21] Appl. No.: 143,075

[22] Filed: Jan. 12, 1988

[51] Int. Cl.⁴ .............................................. B23P 11/02

[52] U.S. Cl. ........................................ 29/451; 29/235; 7/103

[58] Field of Search .................. 29/432, 432.11, 432.2, 29/450, 451, 235; 7/103; 227/156

[56] References Cited

U.S. PATENT DOCUMENTS

| | | | |
|---|---|---|---|
| 3,538,523 | 11/1970 | Sparks | 7/103 |
| 3,541,660 | 11/1970 | Soto | 29/235 |
| 3,546,726 | 12/1970 | Bizzigotti | 7/103 |
| 3,546,764 | 12/1970 | Clapp | 29/235 |
| 3,559,273 | 2/1971 | Porzio | 29/432 UX |
| 3,667,105 | 6/1972 | Sharpe | 29/235 |
| 3,737,932 | 6/1973 | Armijo | 7/103 |
| 4,169,305 | 10/1979 | Kruszona | 29/235 |
| 4,750,226 | 6/1988 | Costill | 7/103 |

*Primary Examiner*—Charlie T. Moon

[57] ABSTRACT

The disclosure relates to an improved tool and method for laying carpet. More particularly, the disclosure relates to a hand tool including a tucker wheel member mounted on one end of a handle and a flat tucker blade attached to the opposite end of the handle and a method of using the tool for tucking down the edge of a carpet when the carpet is laid over tacking strips.

6 Claims, 3 Drawing Sheets

CARPET LAYING TOOL AND METHOD OF USE

BACKGROUND OF THE INVENTION

1. Field of the Invention

This invention relates to an improved tool for laying carpets. More particularly the invention relates to a hand tool for tucking down the edge of a carpet when the carpet is laid over tacking strips.

Specifically, the invention provides a new and highly efficient double action carpet laying tool for use in tucking down the edge of a carpet over tacking strips when laid to the edge of a wall, said tool comprising a curved handle with the center portion being adapted to being grasp by a human hand and permitting the fingers of the hand to fit around and under the handle, and the front and rear terminal end portions of the handle being curved downward, the front terminal end of the handle being attached, preferably by an extending arm, to a moveable tucker wheel member which wheel is free to rotate when the hand presses the handle downward and is adapted to fitting in the groove between the edge of the carpet and the wall to turn the edge of the carpet downward over the tacking strip, and the rear terminal end of said handle fixedly attached to a short flat tucking blade member with a slightly rounded bottom edge which blade is also adapted to fitting in the groove between the edge of the carpet and the wall to insure that the edge of the carpet remains turned down over the tacking strip.

The invention further provides a preferred embodiment of the above-described carpet laying tool wherein the handle is modified so as to permit rapid and easy replacement of the tucker wheel and tucking blade in the event the wheel and blade become worn from extended use.

2. Prior Art

It is common practice in the laying of carpet to first place tacking strips along the outer boundaries within a fraction of an inch from the outer walls, stretch the carpet over the said tacking strips, cut the carpet and then tuck the edge of the carpet down into the groove between the wall and tacking strip. To tuck the edge of the carpet over the strips one generally employs a chisel or other blunt instrument. One instrument to be used for tucking in combination with a carpet cutter is disclosed in U.S. Pat. No. 3,546,726.

The prior used instruments for tucking, however, have not been entirely satisfactory. In many cases, the tools used have not been able to consistently tuck the edge at the desired right angle, and the tucking has appear uneven. In addition, in some cases the tucking has not been effective in all areas and it has been necessary to go over the tucking again to insure a satisfactory job. Such repeated operations take considerable time and adds to the cost of the carpet laying. There is thus a great need in the carpet laying business for a tool that could be used to quickly and easily effect a clean and complete tucking of the carpet in a single operation.

It is an object of the invention, therefore, to provide a type of carpet laying tool which corrects many of the above-noted problems. It is a further object to provide a carpet tucking tool which consistently provides a very even tucking of the carpet edge. It is a further object to provide a new carpet tucking tool which effects a complete tucking and avoids the necessity of repeating the operation. It is a further object to provide a carpet tucking tool which easy to operate and economical to produce. It is a further object to provide a carpet tucking tool which is easy to maintain and keep in excellent operating condition at all times. These and other objects will be apparent from the following detailed description thereof.

SUMMARY OF THE INVENTION

It has now been discovered that these and other objects can be accomplished by the new double action carpet tucking tool of the present invention which presents for the first time an efficient tucking tool that can quickly and easily form an even and complete tucking of the carpet edge.

The new carpet tucking tool of the present invention comprises in combination a curved handle with a front and rear end with the center portion being adapted to being graps by a human hand and permitting the fingers of the hand to fit around and under the handle, and the front end rear end being curved downward, the front terminal end of said handle being attached, preferably through an extending arm, to a moveable tucker wheel member which wheel is free to rotate when the hand presses the handle downward and is adapted to fitting in the groove between the edge of the carpet and the wall to turn the edge of the carpet downward over the tacking strip, and the rear terminal end of said handle fixedly attached to a short flat tucking blade member with a slightly rounded bottom edge which blade is adapted to fitting in the groove between the edge of the carpet and the wall to insure that the edge of the carpet remains down over the tacking strip.

The new carpet laying tool of the present invention is utilized in a very quick and efficient manner by having the carpet layer grasp the tool by the handle and run the tucker wheel in the groove between the strip and the wall and have the tucking blade follow behind in the same groove to insure that the carpet is completely and evenly tucked over the tacking strip.

It has been surprisingly found that when the new tool is utilized as above, many of the above-noted problems of the prior techniques have been corrected. It has been found, for example, that the new tool insures a 100% even tucking of the carpet edge and there is no need to following up over the same edge to insure an even and complete tuck. In addition, the tucking can be completed in a single movement and thus reduce the time and cost of the carpet laying.

A further advantage is also found in the preferred embodiment wherein the handle is modified so as to permit rapid and easy replacement of the tucker wheel and tucking blade in the event the wheel and the blade become worn from extended use. This permits one to save time in the operation as well as to insure that the tool is always operable and provides the complete and even tuck of the carpet edge.

Further advantage is also found in the fact that the tool is of simple construction and capable of being manufactured at a low cost and thus available to all carpet laying personnel.

DESCRIPTION OF THE DRAWINGS

The various objects and features of the present invention will be more fully understood by reference to the accompanying drawings.

DETAILED DESCRIPTION OF THE INVENTION

Figure 1:
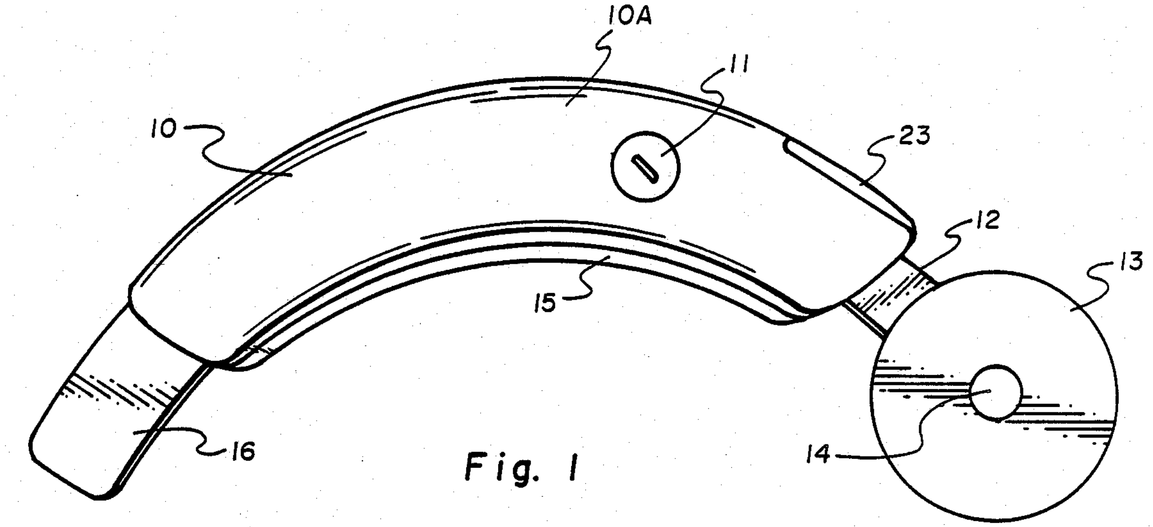
FIG. 1 is a front view of the carpet tool of the present invention.

With reference to FIG. 1, the new tool is shown as 10. The handle is made up of two parts, the front part 10A and the bottom half 15. The two halves are held together by bolt or piloting means 11. The bottom half has a protruding section 23 to hold the top half in place when the top half is in the closed position. Tucker wheel 13 is held on extending arm 12 by screw or bolt means 14.

Figure 2:
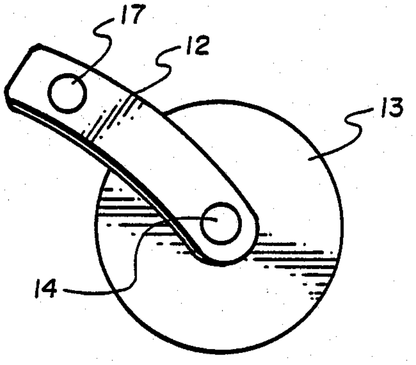
FIG. 2 is a front view of the detached tucker wheel and extending arm.

With reference to FIG. 2, the extending arm is shown as 12 joined to the tucker wheel 13 by screw means 14, with opening 17 at the end of the extending arm providing means to join the extending arm to the end of the handle.

Figure 2A:
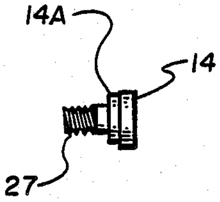
FIG. 2A illustrates the type of screw member that can be used to hold the wheel on the extending arm.
Figure 3:
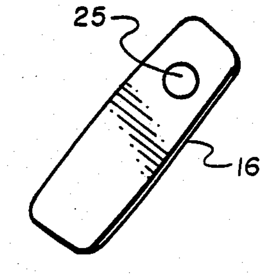
FIG. 3 is a front view of the tucking blade.
Figure 2B:
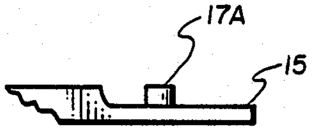
FIG. 2B illustrates the type of plug that could be used to hold the extending arm on the handle.

FIG. 2A illustrates the screw means for holding the wheel on the extending arm, i.e. screw 14 with bushing 14A, and FIG. 2B illustrates the plug 17A which is on the cut out portion of the bottom half of the handle to hold said extending arm onto the terminal end of the handle. FIG. 3 is a front view of tucking blade 16 with opening 25 which can fit over a plug similar to 17 shown in FIG. 2B.

Figure 4:
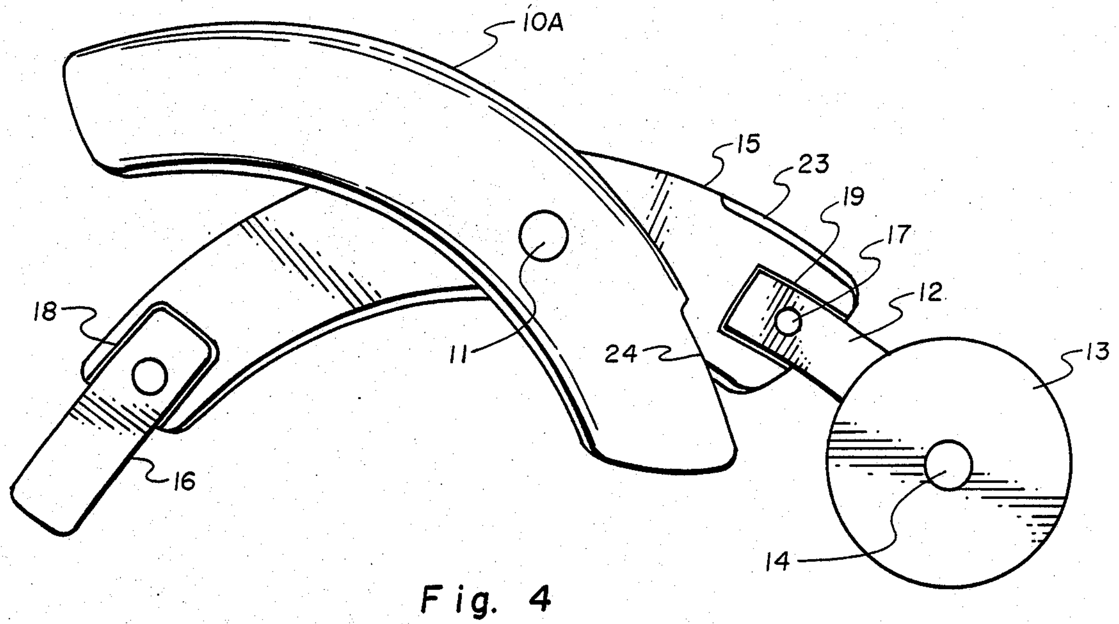
FIG. 4 is a perspective view illustrating how the two part handle can be opened to allow removal of the wheel and the tucking blade.
Figure 4A:
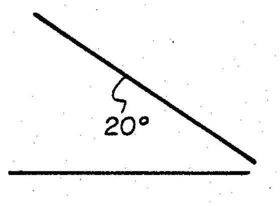
FIG. 4A illustrates a suggested angle for the downward bend of the ends of the handle.

FIG. 4 is a perspective view showing the preferred embodiment wherein the handle is made in two halves and opens up to allow changing of the tucker wheel and the tucking blade. The top half of the handle 10A pivots on screw or bolt means 11 so that it can swing open to disclose the bottom half of the handle. When closed, the top half is held in place by the extending ledge 23 of the bottom half fitting against the cut away portion 24 of the top half of the handle. The extending arm 12 with tucker wheel 13 is held in the cut out portion 19 of the bottom half of the handle 15. The tucking blade 16 is shown in the cut out portion 18 of the other end of the bottom half of the handle and is held in place by placing the blade so that the opening 25 fits over plug 25A on the bottom half of the handle. FIG. 4A illustrates a suggested angle for the downward bend of the handle ends.

Figure 5:
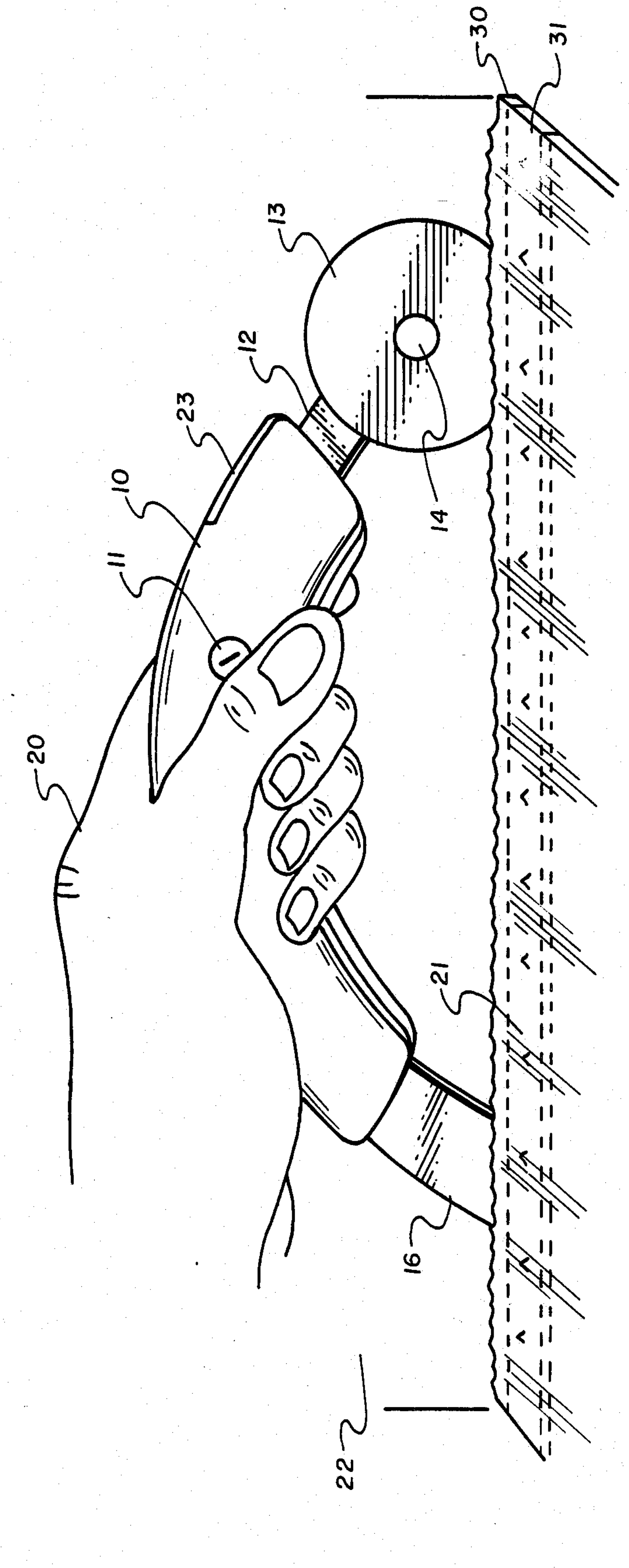
FIG. 5 is a perspective view showing how the tool can be grasp and used for the pressing of the edge of the carpet over the tacking strip.

FIG. 5 illustrates how the new tool can be used to insure a complete and even tucking of the edge of the carpet over the tacking strip. The handle 10 is grasp by hand 20 and the handle pressed down so that the tucker wheel 13 rides in the groove between the edge 30 of the carpet 21 and the wall 22. The tucking blade at the other hend of the handle is also placed in the same groove and follows along in that groove as the handle is pressed forward. In this way the edge of the carpet is tightly tucked over the tacking strip 31. The other parts of the tool are as described above.

The handle of the new carpet laying tool can be of any suitable construction as long as it provides a place for the hand to gasp the tool and to have the front and back end of the handle extending downward. The angle of the downward trend of the ends can be varied over a wide range as long as it permits the fingers of the hand to be grasp under the handle and provide a downward movement for the tucker wheel and the tucking blade. In general, the angle downward may vary from about 20 to 40 degrees such as illustrated in FIG. 4A. The length and width of the handle may also vary as needed. In general, the center part of the handle is just sufficient for the width of a hand which is generally about 4 to 6 inches, with the ends extending downward for sufficient distance to hold the wheel and tucking blade, which in most cases is about 1½ to 3 inches in length. The thickness of the handle should again be just sufficient to be held by the hand which in most cases is from about ¾ inch to about 1½ inches.

As noted above, the handle is preferably prepared in two halves which are held together in the middle by pivoting means, such as bolt means so that the top half can be swung open to review the top of the bottom half which holds the preferred extending arm and wheel and the tucking blade as shown in FIG. 4. Cavities are also provide in the ends of the handle to provide a place for inserting the extending arm holding the wheel and the tucking blade as shown in FIG. 4. The extending arm and the tucking blade can be held in place by any suitable means, such as by placing the hole in the arm and blade over a plug in the cavity or by the insertion of a screw or bolt to hold the said arm and blade in the proper cavity and permit the closing of the top of the handle over the bottom half.

The tucker wheel used on the new tool may be of any suitable diameter, but is preferably one of about 2½ to 3 inches in diameter. The wheel is preferably joined to the end of the extending arm in a rotatable manner or it may be joined in a rotatable manner directly to the end of the handle which has been extended downward a sufficient distance to hold the wheel.

The tucking blade may also vary in side as desired. In general, the blade is about 3 to 5 inches in length and about ¾ to 1½ inches in width. As noted,the blade can be held in the cavity in the bottom half of the handle either in a fixedly manner as by gluing or soldering but is preferably held in a replaceable manner as by screw or bolt means or by having the opening in the blade placed over the plug in the cavity of the bottom half.

The handle, extending arm, wheel and blade can be constructed of any suitable material. They are preferably prepared from metal, such as iron, steel, aluminum, and the like. After extensive wear, the wheel and the blade may become worn and it is advisable to have them replaced as noted above. Because of such extensive wear on these parts, it is advisable to prepare the wheel and blade from very durable material, such as iron or steel.

SPECIFIC EMBODIMENT OF THE INVENTION

A specific embodiment of the new product of the present invention and illustration of its use are illustrated below.

A carpet tucking tool was prepared as follows: A two part handle was prepared from half inch thick steel sheeting. The center handle grip portion of both halves was about 4 inches long and about 2 inches wide with both ends extending downward for about two inches to form a 20° angle with the surface of the rug to be tucked. The bottom half of the handle was modified so as to provide a cavity or recess 1 inch by 1½ inches and about ⅛ inch deep at both ends of the said handle to provide places for the extension arm and tucking blade. The bottom half also possessed a two inch by ½ inch ledge on the top wheel end to retain the top half of the handle when it was allowed to pivot.

The top half of the handle was prepared in the same shape as the bottom half and when placed on top of the bottom half was joined to said bottom half near the center of the hand grip by means of a bolt which permitted the top half to pivot and be revolved downward revealing the bottom half of the handle. A recess on the top side near the wheel end was provided so that it would fit the ledge on the bottom half end and thus prevent the top half from revolving upward.

A tucking blade two and a half inches long and 1 inch in wide was prepared from ⅛ inch steel. The bottom edge was slightly rounded to provide good contact with the edge of the carpet. The tucking blade was placed in the recess at the bottom end of the handle and was retained there by a flat headed screw.

A tucker wheel two and a half inches in diameter was cut from ⅛ inch steel with the circular edge slightly round to aid in the tucking. The wheel was joined at the center with bolt means to the end of a three and a half inch by 1 inch extension arm prepared from ⅛ inch steel. The other end of the extension arm was placed in the recess at the front end of the tool. A half inch hole at the end of the blade was placed over a ½ plug in the recess and the arm was thus retained in the handle when the top half was pivoted closed on the bottom half.

The new tucking tool prepared as above was then used to tuck the edge of a carpet over a tacking strip. This was accomplished by the operator grasping the handle of the new tool and pressing the wheel down in the groove between the tacking strip and the edge of the wall. The tucking blade was also placed in the groove and while trailing the wheel insured that the entire carpet edge was tuck down evenly and completely.

I claim as my invention:

1. A double action carpet laying tool for use in tucking down the edge of a carpet over a tacking strip when the carpet is laid to the edge of a wall, said tool comprising a curved handle with the center portion being adapted to being grasp by a human hand and permitting the fingers of the hand to fit around and under the handle, and the front and rear terminal end portions of said handle being curved downward, the front terminal end of said handle being attached to a moveable tucker wheel member which wheel is free to rotate when the hand presses the handle downward and is adapted to fitting in the groove between the edge of the carpet and the wall to turn the edge of the carpet downward over the tacking strip, and the rear terminal end of said handle fixedly attached to a short flat tucking blade member which blade is also adapted to fitting in the groove between the edge of the carpet and the wall to insure that the edge of the carpet remains turned down over the tacking strip.

2. A double action carpet laying tool for use in tucking down the edge of a carpet over a tacking strip as in claim 1 wherein the front terminal end of the handle is attached to the tucker wheel by means of an extending arm.

3. A double action carpet laying tool as in claim 1 wherein the flat tucking blade member has a slightly rounded bottom edge.

4. A double action carpet laying tool as in claim 1 wherein the tucker wheel member and the tucking blade member are replaceable and are made of hard metal.

5. A double action carpet laying tool as defined in claim 1 which provides easy replacement of both the extending arm holding the tucker wheel and the tucking blade wherein the handle is made up lengthwise of two halves, a bottom half and a top half, said halves being held together in the center by pivoting means which permits the top half to be rotated downward, the bottom half of the handle having at the front terminal end a recess where the extending arm can be placed and held there by removabove means, and the said bottom half having in the rear terminal end a recess where the tucking blade can be removably placed, said halves being joined such that when the top half is rotated over the bottom half, the tucker wheel and tucking blade are securely retained in the recess, but when the top half is rotated, the wheel and tucking blade can be easy removed and replaced.

6. A process for laying carpet which comprises cutting the carpet to the correct size, stretching the carpet tight and placing the edge of the carpet over a tacking strip and then using the carpet laying tool as defined in claim 1 to insure the edge is tucked over the tacking strip by pressing the handle of the tool downward and running the tucker wheel and the tucking blade in the groove between the wall and the tacking strip.

* * * * *